United States Patent
Wo et al.

(10) Patent No.: US 11,256,445 B2
(45) Date of Patent: Feb. 22, 2022

(54) VIRTUAL DISK FILE FORMAT CONVERSION METHOD AND APPARATUS

(71) Applicant: Huawei Technologies Co., Ltd., Shenzhen (CN)

(72) Inventors: Tianyu Wo, Beijing (CN); Junbin Kang, Beijing (CN); Xin Bai, Beijing (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 246 days.

(21) Appl. No.: 16/587,882

(22) Filed: Sep. 30, 2019

(65) Prior Publication Data
US 2020/0026473 A1 Jan. 23, 2020

Related U.S. Application Data

(63) Continuation of application No. PCT/CN2017/115506, filed on Dec. 11, 2017.

(30) Foreign Application Priority Data
Mar. 31, 2017 (CN) .......................... 201710212688.3

(51) Int. Cl.
G06F 3/06 (2006.01)
G06F 9/455 (2018.01)
G06F 12/1009 (2016.01)

(52) U.S. Cl.
CPC .......... *G06F 3/0661* (2013.01); *G06F 3/0604* (2013.01); *G06F 3/064* (2013.01);
(Continued)

(58) Field of Classification Search
CPC ...... G06F 3/0604; G06F 3/064; G06F 3/0661; G06F 3/664; G06F 3/067; G06F 9/45533; G06F 12/1009; G06F 2212/1041
(Continued)

(56) References Cited

U.S. PATENT DOCUMENTS 8,631,423 B1   1/2014  Indalkar
2004/0260919 A1*  12/2004  Takahashi ............. H04L 69/329
                                                    713/2
(Continued)

FOREIGN PATENT DOCUMENTS

CN   101539842 A   9/2009
CN   102375695 A   3/2012
(Continued)

OTHER PUBLICATIONS

Machine Translation and Abstract of Chinese Publication No. CN101539842, Sep. 23, 2009, 16 pages.
(Continued)

*Primary Examiner* — Reginald G Bragdon
*Assistant Examiner* — Aaron D Ho
(74) *Attorney, Agent, or Firm* — Conley Rose, P.C.

(57) ABSTRACT

A virtual disk file format conversion method and an apparatus that relate to the field of virtualization technologies and to resolve a service interruption caused by offline conversion of a virtual machine disk image file format when a virtual machine is migrated between different types of VMMs. The method and apparatus include establishing a mapping table between a virtual address of a virtual machine (VM) disk image file and a physical address of a disk image file that is compatible with a virtual machine monitor (VMM), converting, according to the mapping table, the virtual address used when a user performs reading/writing on the VM disk image file, into the physical address mapped to the virtual address, and performing data reading/writing on the VM disk image file based on the physical address.

19 Claims, 10 Drawing Sheets

(52) U.S. Cl.
 CPC ............ *G06F 3/067* (2013.01); *G06F 3/0664* (2013.01); *G06F 9/45533* (2013.01); *G06F 12/1009* (2013.01); *G06F 2212/1041* (2013.01)

(58) Field of Classification Search
 USPC .......................................................... 711/154
 See application file for complete search history.

(56) References Cited

U.S. PATENT DOCUMENTS

| | | | | |
|---|---|---|---|---|
| 2009/0300426 | A1* | 12/2009 | Eccles ................. | G06F 11/2221 714/42 |
| 2012/0191962 | A1 | 7/2012 | Shu | |
| 2012/0221828 | A1* | 8/2012 | Fang ..................... | G06F 3/0608 711/206 |
| 2013/0246761 | A1* | 9/2013 | Derby ................. | G06F 9/30098 712/225 |
| 2014/0304475 | A1* | 10/2014 | Ramanujan ........... | G06F 1/3225 711/128 |
| 2016/0188211 | A1* | 6/2016 | Song ..................... | G06F 3/0631 711/114 |

FOREIGN PATENT DOCUMENTS

| | | |
|---|---|---|
| CN | 102609214 A | 7/2012 |
| CN | 103412822 A | 11/2013 |
| CN | 105912277 A | 8/2016 |
| CN | 106201344 A | 12/2016 |
| WO | 2011116070 A1 | 9/2011 |

OTHER PUBLICATIONS

Machine Translation and Abstract of Chinese Publication No. CN102375695, Mar. 14, 2012, 17 pages.

Machine Translation and Abstract of Chinese Publication No. CN106201344, Dec. 7, 2016, 23 pages.

Foreign Communication From A Counterpart Application, PCT Application No. PCT/CN2017/115506, English Translation of International Search Report dated Mar. 15, 2018, 2 pages.

Foreign Communication From A Counterpart Application, PCT Application No. PCT/CN2017/115506, English Translation of Written Opinion dated Mar. 15, 2018, 4 pages.

Foreign Communication From A Counterpart Application, European Application No. 17903827.8, Extended European Search Report dated Feb. 13, 2020, 8 pages.

* cited by examiner

VIRTUAL DISK FILE FORMAT CONVERSION METHOD AND APPARATUS

CROSS-REFERENCE TO RELATED APPLICATIONS

This application is a continuation of International Patent Application No. PCT/CN2017/115506 filed on Dec. 11, 2017, which claims priority to Chinese Patent Application No. 201710212688.3 filed on Mar. 31, 2017. The disclosures of the aforementioned applications are hereby incorporated by reference in their entireties.

TECHNICAL FIELD

This disclosure relates to the field of virtualization technologies, and in particular, to a virtual disk file format conversion method and an apparatus.

BACKGROUND

As a means of multiplexing system resources and improving resource utilization, virtual machine technologies are widely researched and applied as cloud computing systems are deployed. In a system virtualization process, a virtual machine monitor (VMM) is responsible for managing a virtual machine (VM) instance in a system, and the VMM constructs virtual resource abstraction at a system level. In this way, a running environment perceived by the VM running in the VMM is almost the same as a physical computing system such that running of software in the VM and migration between VMMs can be implemented without modifying software. In this process, a disk storage resource of the VM is usually carried by a file stored on a physical storage device (for example, a hard disk). The file is referred to as a disk image file. Reading/writing performed on disks in all VMs is translated by the VMM into reading/writing performed on the disk image file such that storage of a plurality of VMs is allowed to be all carried on one physical device, as shown in FIG. 1.

A virtual machine disk (VMDK) image file usually has some internal formats, and is used to record related usage information of the disk of the virtual machine. Each VMM has a compatible virtual machine disk image file format. Because different virtual machine vendors use respective virtual disk formats, when the VMM performs reading/writing on a virtual disk file in a virtual disk format that is incompatible with the VMM, format conversion needs to be performed. An existing conversion tool is an offline conversion tool. That is, when the VM is not running, an entire virtual machine disk image file is scanned using a software tool (such as qemu-img or vmware converter), and a new virtual machine disk image file in a target format is generated such that the virtual machine runs in a new VMM environment. However, the virtual machine needs to wait for a relatively long disk image format conversion time before starting running in a new environment, thereby causing a service interruption.

SUMMARY

This disclosure provides a virtual disk file format conversion method and an apparatus in order to resolve a service interruption caused by offline conversion of a virtual machine disk image file format when a virtual machine is migrated between different types of VMMs.

According to an aspect, a virtual disk file format conversion method is provided and includes establishing, by a network device, a mapping table between a virtual address of a virtual machine VM disk image file and a physical address of a disk image file that is compatible with a VMM, converting, by the network device according to the mapping table, the virtual address used when a user performs reading/writing on the VM disk image file, into the physical address mapped to the virtual address, and performing, by the network device, data reading/writing on the VM disk image file based on the physical address. In this way, online conversion between virtual machine disk image formats can be implemented. In a system environment configuration, a virtual disk image file system can be used to implement cross-adaption of virtual disk image files without a pre-startup image format conversion delay and with a low input/output (I/O) performance loss, and storage support is provided for seamless migration of a virtual machine disk image of the user from a cloud platform to another cloud platform. The virtual disk image file system has a relatively high application value especially in a scenario in which the user has a service encapsulated in the virtual machine disk image file, and test running needs to be performed on different cloud platforms. A mechanism in which a plurality of virtual machine disk image storage file formats coexists during running of one VMM is provided, and less code for conversion between the plurality of storage file formats is developed.

In a possible design, establishing, by a network device, a mapping table between a virtual address of a virtual machine VM disk image file and a physical address of a disk image file that is compatible with a VMM includes mounting, by the network device, the VM disk image file, determining, by the network device, a storage grain of the VM disk image file based on metadata in the VM disk image file, and one-to-one mapping, by the network device, data blocks of the VM disk image file to data blocks of the disk image file that is compatible with the VMM if the storage grain of the VM disk image file is consistent with a storage grain of the disk image file that is compatible with the VMM, or mapping, by the network device, a block index of the VM disk image file to a most significant bit of the physical address of the disk image file that is compatible with the VMM if the storage grain of the VM disk image file is inconsistent with a storage grain of the disk image file that is compatible with the VMM, and mapping an intra-block index of the VM disk image file to a remaining address of the disk image file that is compatible with the VMM. Therefore, according to the newly established mapping table, the virtual address accessed by the user may be mapped to the physical address that is compatible with the VMM, that is, data reading/writing may be performed on the VM disk image file according to the mapping table.

In a possible design, converting, by the network device according to the mapping table, the virtual address used when a user performs reading/writing on the VM disk image file, into the physical address mapped to the virtual address includes obtaining, by the network device according to the mapping table, and the block index and the intra-block index of the virtual address, the physical address mapped to the virtual address if the network device determines that the user performs a read operation on the VM disk image file, and performing, by the network device, data reading/writing on the VM disk image file based on the physical address includes performing, by the network device, reading on the VM disk image file using the physical address. In this way, when the VM is online, a plurality of VM disk image storage file formats coexist during running of one VMM.

In a possible design, converting, by the network device according to the mapping table, the virtual address used when a user performs reading/writing on the VM disk image file, into the physical address mapped to the virtual address includes obtaining, by the network device according to the mapping table, and the block index and the intra-block index of the virtual address, the physical address mapped to the virtual address if the network device determines that the user performs a write operation on the VM disk image file, and performing, by the network device, data reading/writing on the VM disk image file based on the physical address includes performing, by the network device, writing on the VM disk image file using the physical address.

In a possible design, the method further includes reading, by the network device, at a corresponding physical address according to the mapping table, and creating a corresponding buffer block in a memory in order to read from the buffer block during a subsequent read operation on the data block if the network device determines that the user performs a read operation on a data block corresponding to the virtual address of the VM disk image file for a first time, and writing, by the network device, at the corresponding physical address according to the mapping table if the network device determines that the user performs a write operation on the data block, and marking the buffer block as a dirty data block in order to re-read at the corresponding physical address and overwrite the buffer block in the memory when the user performs a read operation on the data block for a next time. In this way, a data translation speed can be improved and intermediate conversion overheads can be reduced. A data block that is recently frequently used is buffered in a kernel virtual file system using a kernel buffer mechanism. If back-end storage is frequently accessed, there is no need to repeatedly perform reading on a back-end file system, and read/write overheads are reduced.

According to another aspect, a network device is provided, including a mapping module configured to establish a mapping table between a virtual address of a virtual machine VM disk image file and a physical address of a disk image file that is compatible with a VMM, where the mapping module is further configured to convert, according to the mapping table, the virtual address used when a user performs reading/writing on the VM disk image file, into the physical address mapped to the virtual address, and a read/write module configured to perform data reading/writing on the VM disk image file based on the physical address.

In a possible design, the mapping module is configured to mount the VM disk image file, determine a storage grain of the VM disk image file based on metadata in the VM disk image file, and one-to-one map data blocks of the VM disk image file to data blocks of the disk image file that is compatible with the VMM if the storage grain of the VM disk image file is consistent with a storage grain of the disk image file that is compatible with the VMM, or map a block index of the VM disk image file to a most significant bit of the physical address of the disk image file that is compatible with the VMM if the storage grain of the VM disk image file is inconsistent with a storage grain of the disk image file that is compatible with the VMM, and map an intra-block index of the VM disk image file to a remaining address of the disk image file that is compatible with the VMM.

In a possible design, the mapping module is configured to obtain, according to the mapping table, and the block index and the intra-block index of the virtual address, the physical address mapped to the virtual address if the network device determines that the user performs a read operation on the VM disk image file, and the read/write module is configured to perform reading on the VM disk image file using the physical address.

In a possible design, the mapping module is configured to obtain, according to the mapping table, and the block index and the intra-block index of the virtual address, the physical address mapped to the virtual address if the network device determines that the user performs a write operation on the VM disk image file, and the read/write module is configured to perform writing on the VM disk image file using the physical address.

In a possible design, the network device further includes a storage module configured to read at a corresponding physical address according to the mapping table, and create a corresponding buffer block in a memory in order to read from the buffer block during a subsequent read operation on the data block if the network device determines that the user performs a read operation on a data block corresponding to the virtual address of the VM disk image file for a first time, and write at the corresponding physical address according to the mapping table if the network device determines that the user performs a write operation on the data block, and mark the buffer block as a dirty data block in order to re-read at the corresponding physical address and overwrite the buffer block in the memory when the user performs a read operation on the data block for a next time.

The mapping table between the virtual address of the virtual machine VM disk image file and the physical address of the disk image file that is compatible with the VMM is established, the virtual address used when the user performs reading/writing on the VM disk image file is converted, according to the mapping table, into the physical address mapped to the virtual address, and further, data reading/writing is performed on the VM disk image file based on the physical address such that online conversion between virtual machine disk image formats can be implemented. In a system environment configuration, a virtual disk image file system can be used to implement cross-adaption of virtual disk image files without a pre-startup image format conversion delay and with a low I/O performance loss, and storage support is provided for seamless migration of a virtual machine disk image of the user from a cloud platform to another cloud platform. The virtual disk image file system has a relatively high application value especially in a scenario in which the user has a service encapsulated in the virtual machine disk image file, and test running needs to be performed on different cloud platforms. A mechanism in which a plurality of VM disk image storage file formats coexist during running of one VMM is provided, and less code for conversion between the plurality of storage file formats is developed.

DESCRIPTION OF EMBODIMENTS

The embodiments of this disclosure may be applied to a scenario in which different formats of virtual disks are online converted into corresponding compatible formats in order to support migration of a virtual machine between different types of VMMs.

Figure 1:
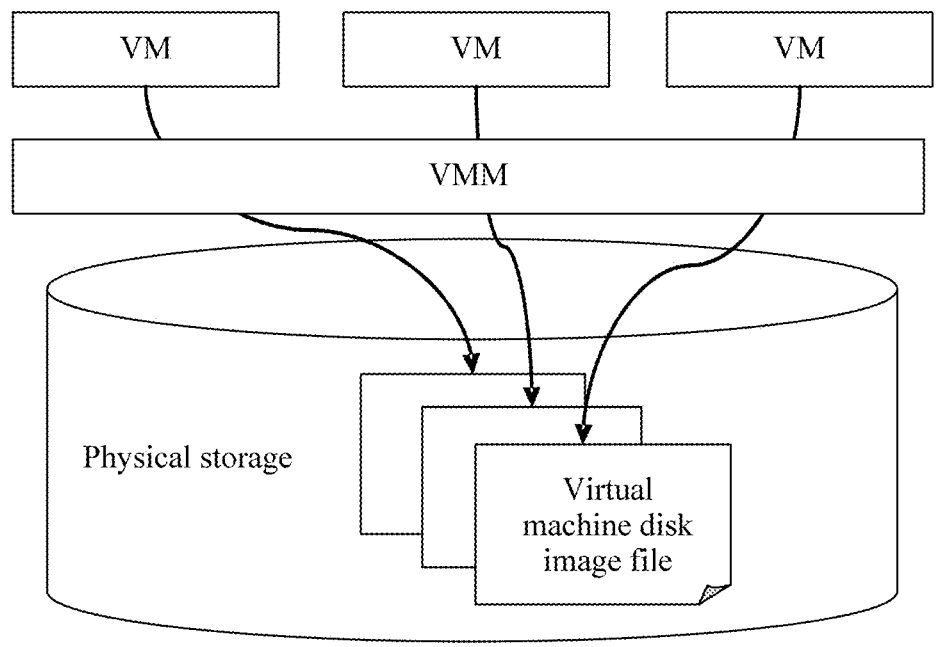
FIG. 1 is a schematic diagram in which a VMM translates reading/writing on a disk in a VM into reading/writing on a disk image file.
Figure 2:
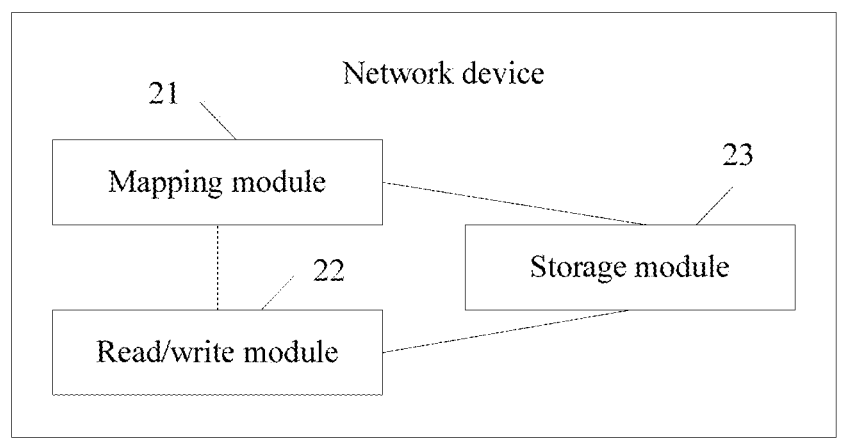
FIG. 2 is a schematic structural diagram of a network device according to an embodiment.

A network architecture may be applied to different network devices. For example, the network devices may be a personal computer, a server, and a mobile phone. One or more virtual machines VMs, a VMM, and virtual machine disk image files corresponding to the VMs may be deployed in the network device. The network device is responsible for carrying. Different VMs may correspond to different virtual machine disk image files. Reading/writing performed on disks in all VMs may be translated by the VMM into reading/writing performed on the disk image files such that storage of a plurality of VMs is allowed to be carried on one network device. As shown in FIG. 2, the network device 2 may include a mapping module 21, a read/write module 22, and a storage module 23. The mapping module 21 is configured to establish a mapping table between a virtual address of a VM disk image file and a physical address of a disk image file that can be identified by a VMM. When a user performs a read/write operation, the mapping module 21 is further configured to convert, according to the mapping table, the virtual address used when the user performs reading/writing on the VM disk image file, into the physical address mapped to the virtual address. The read/write module 22 is configured to perform data reading/writing on the VM disk image file based on the physical address. The storage module 23 is configured to store a data block, metadata of the data block, a physical address and a virtual address of the data block, a corresponding application program used to perform the method, and the like. For specific applications of the mapping module 21, the read/write module 22, and the storage module 23 in the embodiments of this application, refer to descriptions in the following embodiments. In the disclosure, the virtual machine disk image file and the disk image file have a same meaning.

Figure 3:
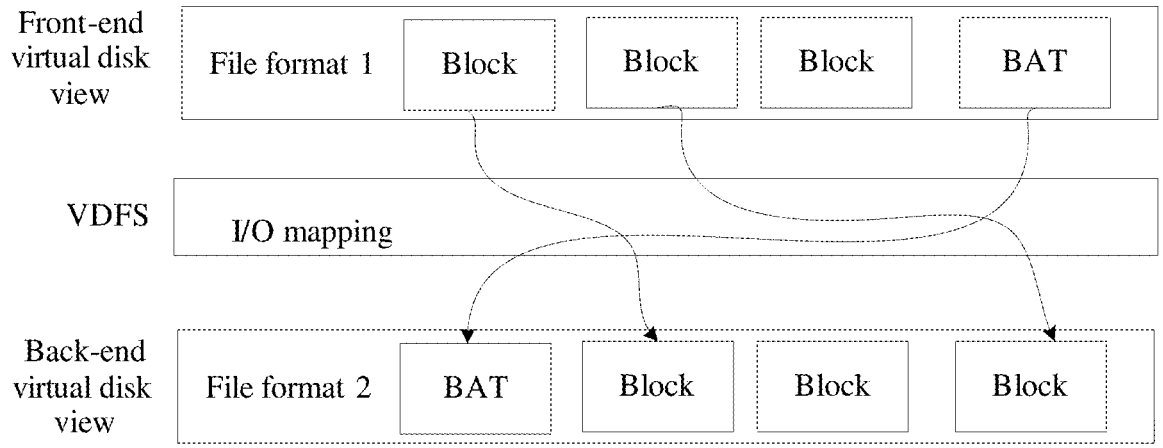
FIG. 3 is a schematic diagram of layers of an implementation object according to an embodiment.

An implementation object in the embodiments of this application may include three layers. As shown in FIG. 3, a target virtual machine disk image format at an uppermost layer may be referred to as a front-end virtual disk view, and include several storage grains that may also be referred to as blocks herein. A VDFS in the middle includes an I/O mapping mechanism, and is responsible for mapping a storage unit address in a source virtual disk view to a corresponding unit address in the target virtual disk format. A source virtual machine disk image format at a lowermost layer may be referred to as a back-end virtual disk image view, and also include several storage grains.

Figure 4:
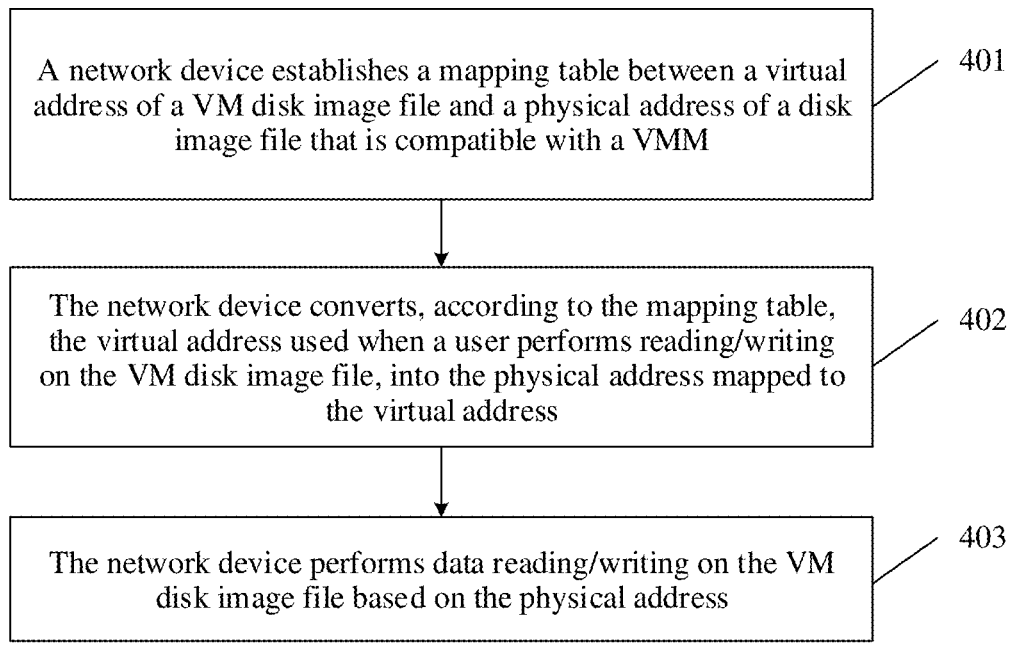
FIG. 4 is a schematic flowchart of a virtual disk file format conversion method according to an embodiment.

As shown in FIG. 4, implementation of an online conversion method of virtual disk file formats for read/write buffer at a file system layer may include the following steps.

Step 401. A network device establishes a mapping table between a virtual address of a VM disk image file and a physical address of a disk image file that is compatible with a VMM.

When the VM is migrated from one VMM to another VMM, if the network device determines that a format of the VM disk image file is different from a format of the disk image file supported by the VMM, the network device may first mount the VM disk image file, and then establish the mapping table based on layout characteristics of virtual disk format files at a front end and a back end. A storage grain of the VM disk image file may be first determined based on metadata in the VM disk image file. For different formats of virtual machine disk image files, different data block sizes may be defined, and a format of a block allocation table may be different. The block allocation table may have a plurality of levels, but finally show same data logical distribution.

Figure 5:
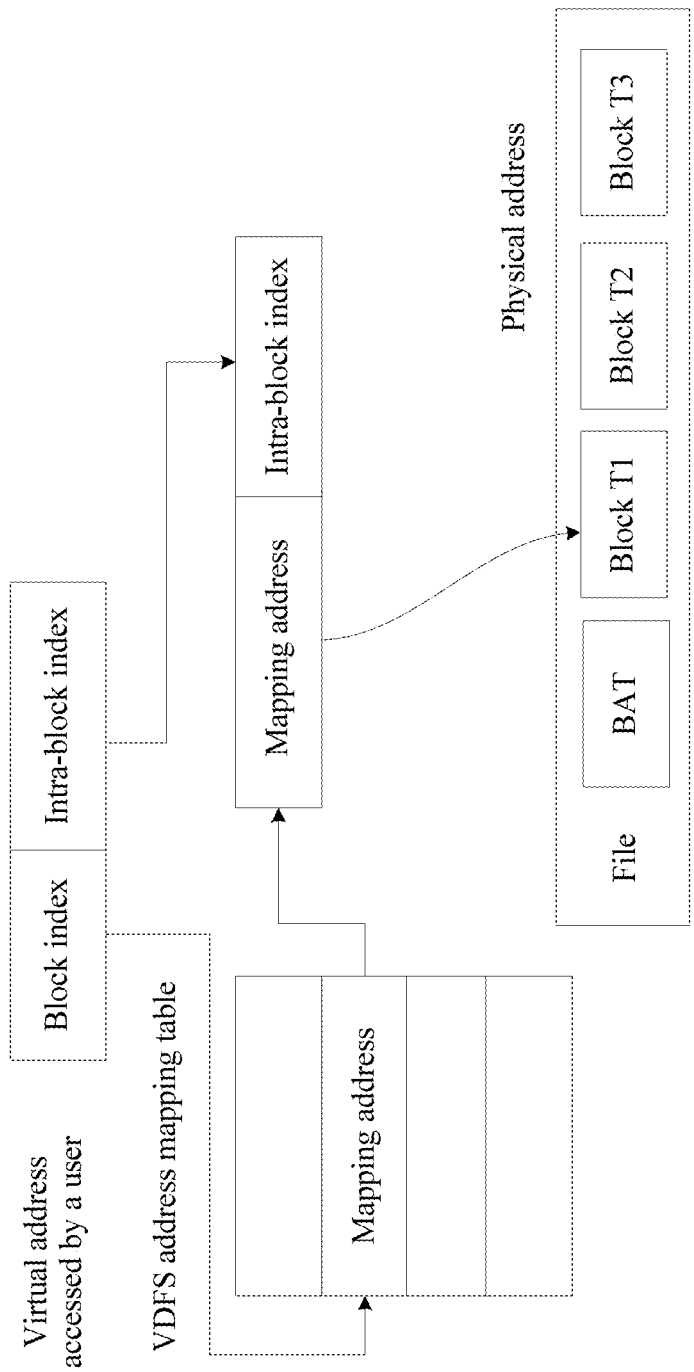
FIG. 5 is a schematic diagram of a mapping and conversion relationship from a virtual address to a physical address according to an embodiment.

Then, a virtual disk address accessed by a user, namely, a logical address of a back-end virtual disk view is converted into a physical address of a front-end virtual disk view. The conversion may be completed using a VDFS address mapping table, and the VDFS address mapping table includes a plurality of mapping addresses, as shown in FIG. 5. First, a mapping relationship may be determined, to be specific, there is a mapping relationship between data locations of virtual disk image files at a front end and a back end. The relationship is formed through converting by a middle block. If a storage grain of a front-end virtual disk image format is consistent with a storage grain of a back-end virtual disk image format, the relationship is one-to-one mapping. To be specific, if the storage grain of the VM disk image file is consistent with the storage grain of the disk image file that is compatible with the VMM, the network device one-to-one maps data blocks of the VM disk image file to data blocks of the disk image file that is compatible with the VMM. If the storage grain of the VM disk image file is inconsistent with the storage grain of the disk image file that is compatible with the VMM, the network device may map a block index of the VM disk image file to a most significant bit of the physical address of the disk image file that is compatible with the VMM, and map an intra-block index (also referred to as Block-Offset) of the VM disk image file to a remaining address of the disk image file that is compatible with the VMM.

Step 402. The network device converts, according to the mapping table, the virtual address used when a user performs reading/writing on the VM disk image file, into the physical address mapped to the virtual address.

When the network device determines that the user performs a read operation on the VM disk image file, online read/write redirection may be implemented at the file system layer according to the mapping table. Herein, the back-end disk image file may be transmitted to the VDFS as a parameter, and the VDFS is implemented as a virtual file system. The VDFS reads the back-end disk image file, and simulates a front-end disk image file view. For metadata conversion, the format of the image file that is compatible with the VMM may be simulated in an all-linear storage manner based on a requirement (such as a block size) on the front-end disk image format. For data block reading/writing, conversion may be directly completed according to the VDFS address mapping table.

Step 403. The network device performs data reading/writing on the VM disk image file based on the physical address.

If the network device determines that the user performs a read operation on the VM disk image file, the network device may obtain, according to the mapping table, and the block index and the intra-block index of the virtual address accessed by the user, the physical address mapped to the virtual address, and then perform reading on the VM disk image file using the physical address. If the network device determines that the user performs a write operation on the VM disk image file, the network device may obtain, according to the mapping table, and the block index and the intra-block index of the virtual address, the physical address mapped to the virtual address, and then perform writing on the VM disk image file using the physical address.

Figure 6:
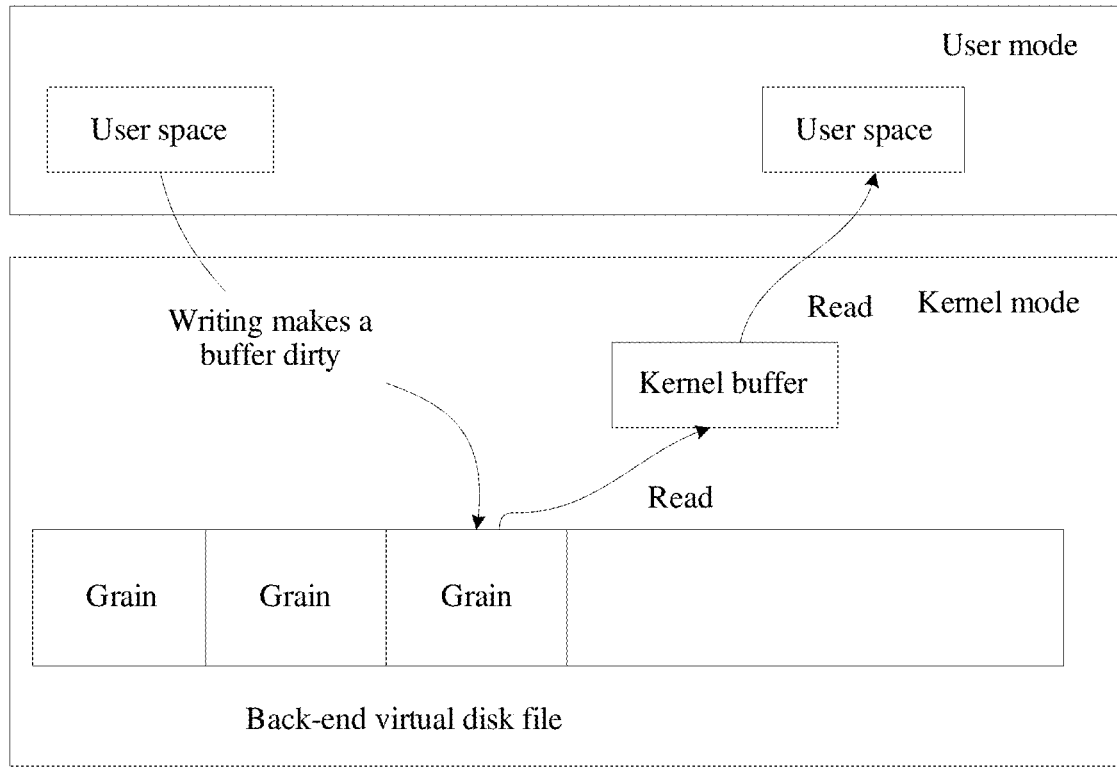
FIG. 6 is a schematic diagram of a built-in read/write buffer mechanism in virtual disk file system (VDFS) according to an embodiment.

As shown in FIG. 6, to improve a data translation speed and reduce intermediate conversion overheads, a data block that is recently frequently used may be directly buffered in a kernel virtual file system using a kernel buffer mechanism in the VDFS. If storage of a back-end virtual disk image file is frequently accessed, there is no need to repeatedly perform reading on a back-end file system, and read/write overheads can be reduced. When the user reads data for a first time, the data may be stored in a kernel buffer such that the data is directly read from the kernel buffer for a next time. When the user writes new data into a data block, the data is directly written into a data block corresponding to a disk. A corresponding data block in the kernel buffer is denoted as a dirty data block, that is, the writing makes the buffer dirty. When the data in the data block is read for a next time, the data block is re-read from the disk and stored in the kernel buffer.

In this embodiment, the mapping table between the virtual address of the virtual machine VM disk image file and the physical address of the disk image file that is compatible with the VMM is established, the virtual address used when the user performs reading/writing on the VM disk image file is converted, according to the mapping table, into the physical address mapped to the virtual address, and further, data reading/writing is performed on the VM disk image file based on the physical address such that online conversion between virtual machine disk image formats can be implemented. In a system environment configuration, the virtual disk image file system can be used to implement cross-adaption of virtual disk image files without a pre-startup image format conversion delay and with a low I/O performance loss, and storage support is provided for seamless migration of a virtual machine disk image of the user from a cloud platform to another cloud platform. The virtual disk image file system has a relatively high application value especially in a scenario in which the user has a service encapsulated in the virtual machine disk image file, and test running needs to be performed on different cloud platforms. A mechanism in which a plurality of virtual machine disk image storage file formats coexist during running of one VMM is provided, and less code for conversion between the plurality of storage file formats is developed.

An offline conversion tool is compared with an online conversion tool implemented by the VDFS in this embodiment. The existing offline conversion tool does not support VM online migration crossing heterogeneous VMMs. The online conversion tool VDFS provides an abstraction layer between the VMM and the back-end virtual disk. The abstraction layer dynamically converts VMM access to the front-end virtual disk view into access to the back-end virtual disk, and shields a format difference in the back-end virtual disk for the VMM. In this way, VM online migration crossing heterogeneous VMMs can be supported in real time, without waiting for completion of offline conversion. In an actual application scenario of a virtual machine image, a read/write range of a data block is actually relatively limited. For example, a working set at startup is usually limited to a small quantity of disk blocks. Using an optimization mechanism such as buffering, I/O overheads for online conversion can be reduced, and performance of the disk image after an offline conversion tool is used is reached.

Figure 7:
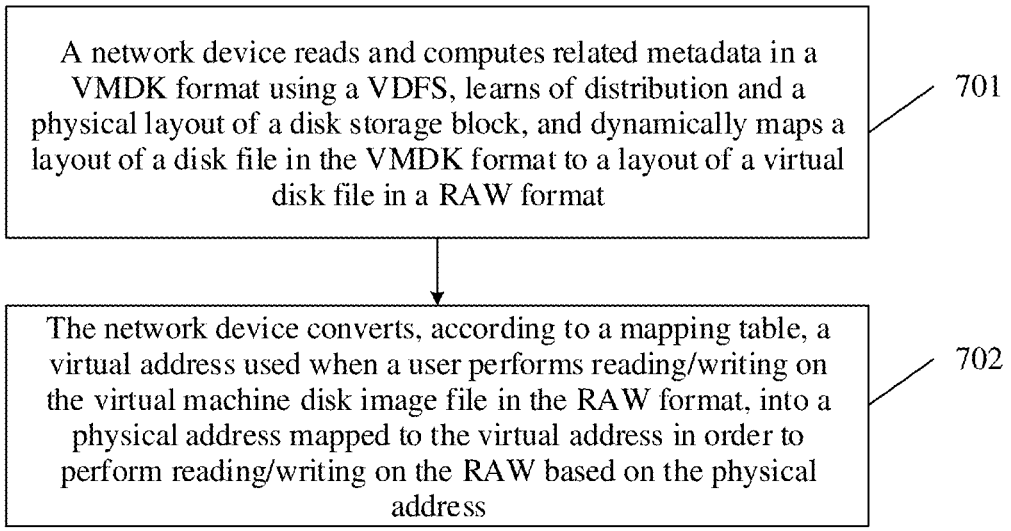
FIG. 7 is a schematic flowchart of an online conversion process from a VMDK format to a read and write (RAW) format according to an embodiment.

The following uses an example in which an original virtual machine disk image in a VMDK format of a user is mounted using a VDFS, and reading/writing is performed on the virtual machine disk image file in a VMM that supports only a RAW format. That is, an online conversion process from the VMDK format to the RAW format is used as an example for description. As shown in FIG. 7, the method includes the following steps.

Step 701. A network device reads and computes related metadata in the VMDK format using the VDFS, learns of distribution and a physical layout of disk storage blocks, and dynamically maps a layout of a disk file in the VMDK format to a layout of a virtual disk file in the RAW format.

Figure 8:
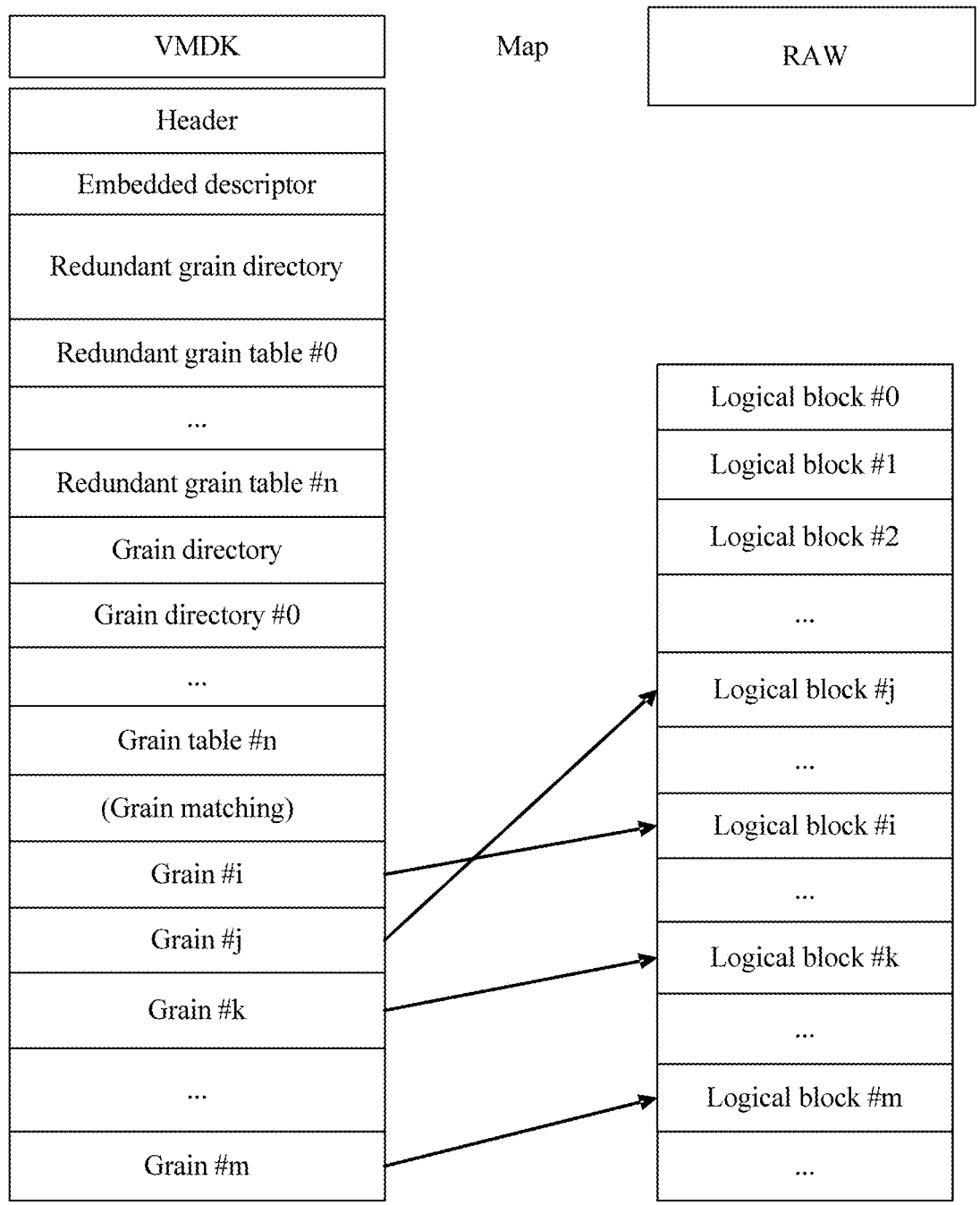
FIG. 8 is a schematic diagram of mapping a virtual disk in a VMDK format to a virtual disk in a RAW format according to an embodiment.

As shown in FIG. 8, a RAW file may be first logically divided into logical blocks that are in a same size as a grain in the virtual disk file in the VMDK format. Then, grains in the VMDK virtual disk file are mapped to corresponding logical blocks in the RAW one by one according to a sequence in a level-2 directory table in the VMDK virtual disk file.

Figure 9:
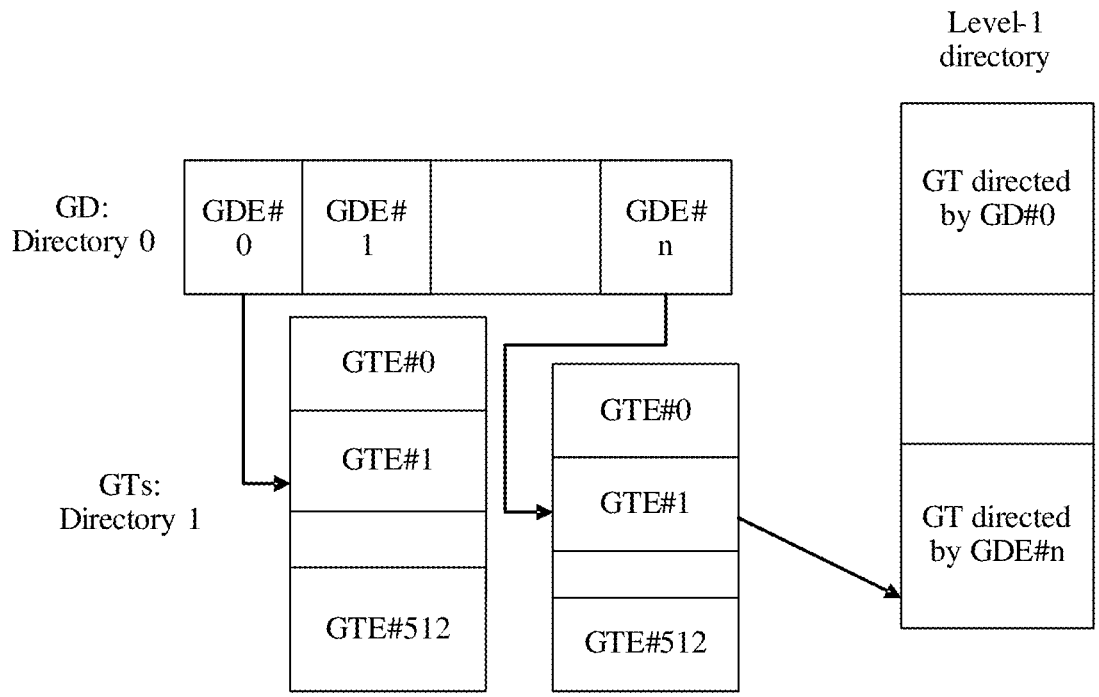
FIG. 9 is a schematic diagram of converting a level-2 directory into a level-1 directory according to an embodiment.
Figure 10A:
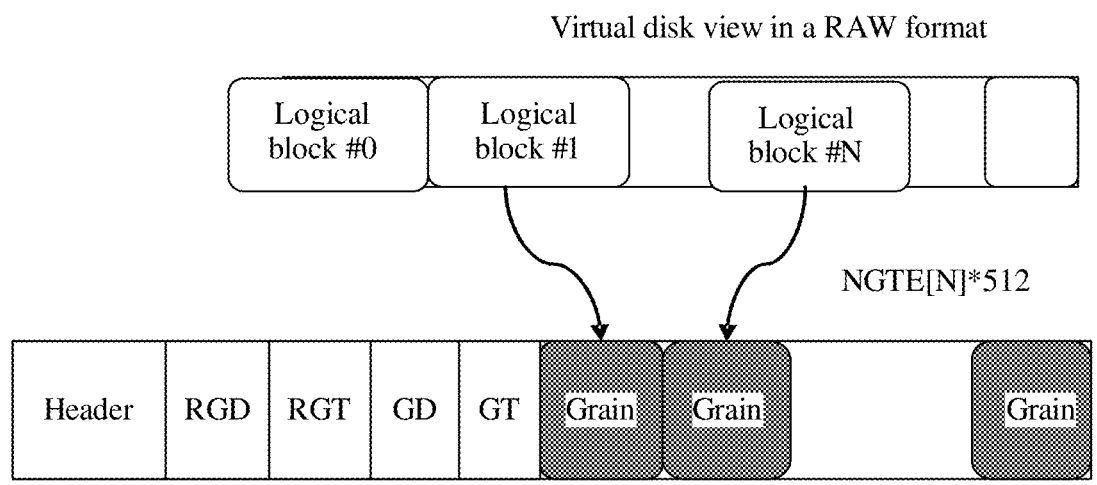
FIG. 10A is a schematic diagram of mapping a VMDK virtual disk to a RAW virtual disk according to an embodiment.

Further, as shown in FIG. 9, the VMDK virtual disk file may be read into a memory according to a sequence of grain directory entries (GDE) in a grain directory (GD), and a new mapping grain table (NGT) is established such that a level-2 directory in the VMDK virtual disk file is converted into a level-1 directory. Then, as shown in FIG. 10A, a virtual disk file in a back-end VMDK format may be mapped to a virtual disk file in a front-end RAW format based on the newly established NGT. In this way, a logical block on which a user performs reading/writing is calculated based on a front-end RAW virtual disk view, and then the NGT may be queried to map the logical block to an actual location at which data is located in the back-end VMDK virtual disk file.

Step 702. The network device converts, according to a mapping table, a virtual address used when a user performs reading/writing on a virtual machine disk image file in the RAW format, into a physical address mapped to the virtual address in order to perform reading/writing on the RAW based on the physical address.

Figure 10B:
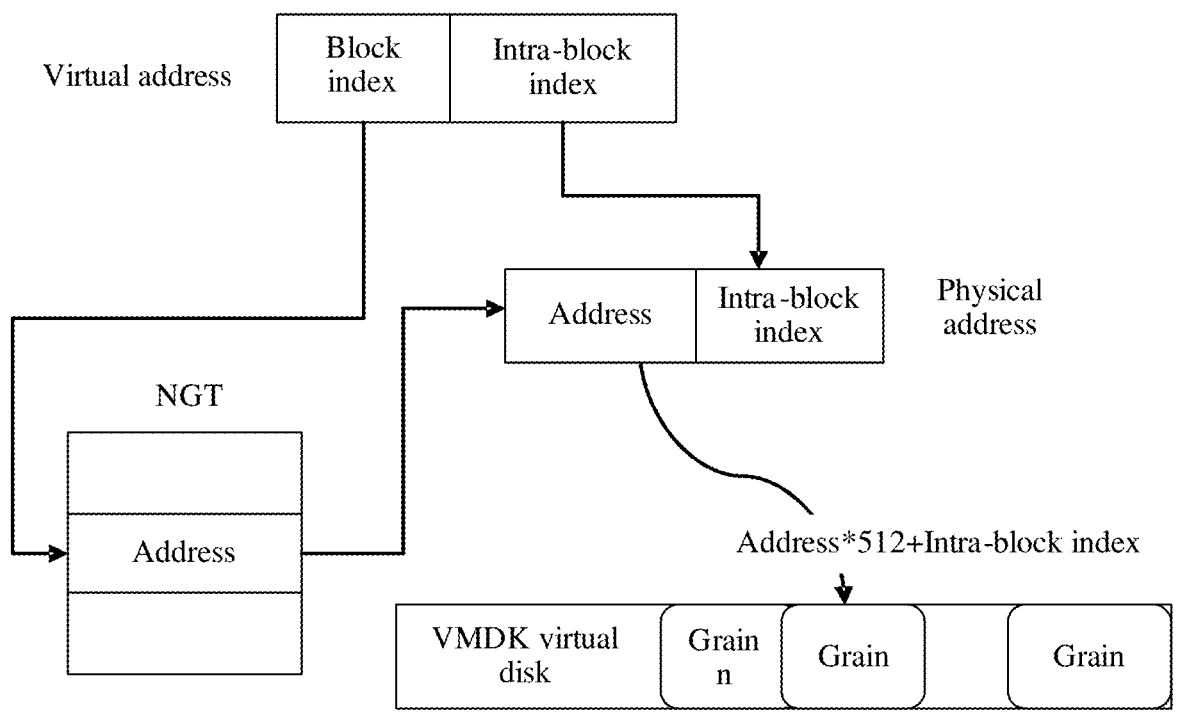
FIG. 10B is a schematic diagram of mapping a virtual address to a physical address according to an embodiment.

FIG. 10B is a schematic diagram of established mapping from a virtual address to a physical address. When reading/writing is performed on the image file in the RAW format, the address used when the user performs reading/writing, namely, the virtual address (vaddress) is divided into a block index (also referred to as gindex) and an intra-block index (also referred to as offset) according to the following formula: gindex=vaddress/grain_size, and offset=vaddress % grain_size, where grain_size indicates a block size. The table NGT is queried to obtain a grain offset address in the back-end VMDK virtual disk image file, then an offset of the data in the grain is added to obtain the physical address, and then data reading/writing is performed at the physical address in the VMDK virtual disk image file. If the gain offset obtained through query is null, for example, is equal to 1, it may indicate that a read/write location has not been allocated.

Figure 11:
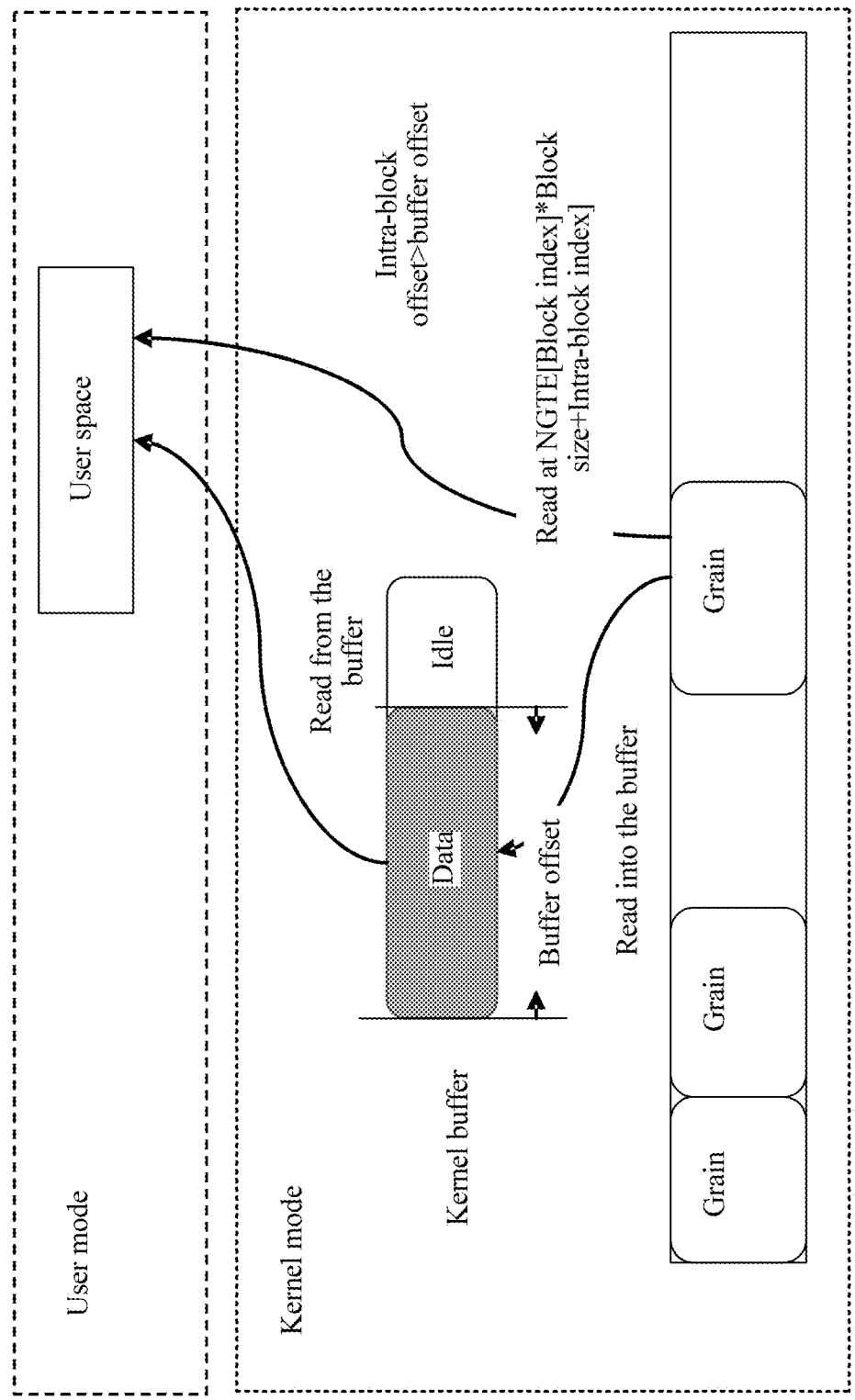
FIG. 11 is a schematic diagram of design and implementation of a kernel buffer according to an embodiment.

FIG. 11 is a schematic diagram of design and implementation of a kernel buffer. For a read request, if the gindex obtained according to the foregoing formula is null, or exceeds a virtual capacity of the VMDK virtual disk, an error is returned to the user, or last block data in the VMDK is aligned if necessary. Then, it may be first determined whether to-be-read data is in the kernel buffer. If an intra-block offset is also in a data area in the buffer, and if a dirty flag bit of the data area is 0, it indicates that data in the data area is consistent with that in a corresponding data area in the disk, and data may be read from the data area in the buffer and returned. If the intra-block offset is not in the data area in the buffer, addressing may be performed to obtain a location NGT (gindex) of a grain corresponding to a logical block in the back-end virtual disk in the VMDK format, a grain with a size of grain_size is read into the kernel buffer, and a length pre_off and a logical number gindex of actually read data are recorded such that the data can be directly read from the kernel buffer for a next time. If the intra-block offset is in the data area in the buffer, but the dirty flag bit part is not 0, that is, if the offset is greater than a buffer offset pre_off, it indicates that the intra-block offset of the to-be-read data is not covered by data in the buffer, addressing may be performed to obtain NGTE[gindex]*grain_size+offset, and be read from the disk. If offset is less than or equal to pre_off, data may be read from the buffer and be directly copied to user space.

For a write request, when it is determined whether a mapped location is available, if gindex calculated according to the foregoing formula is null, for example, 0, it indicates that a data block is not allocated, and in this case, a data block of a new grain may be allocated. If gindex obtained through calculation exceeds a file size, an error may be returned to the user space. If the gindex calculated according to the foregoing formula is not null, addressing may be performed to obtain NGTE[gindex]*grain_size+offset, and data is written into the back-end disk image file in the VMDK format. In addition, a buffer flag is updated. If a logical block number written into the front-end virtual disk view is consistent with a front-end view logical number corresponding to data in the buffer, the dirty flag bit needs to be set to 1, and it indicates that the data is dirty. The data needs to be read from the disk when being subsequently read.

Figure 12:
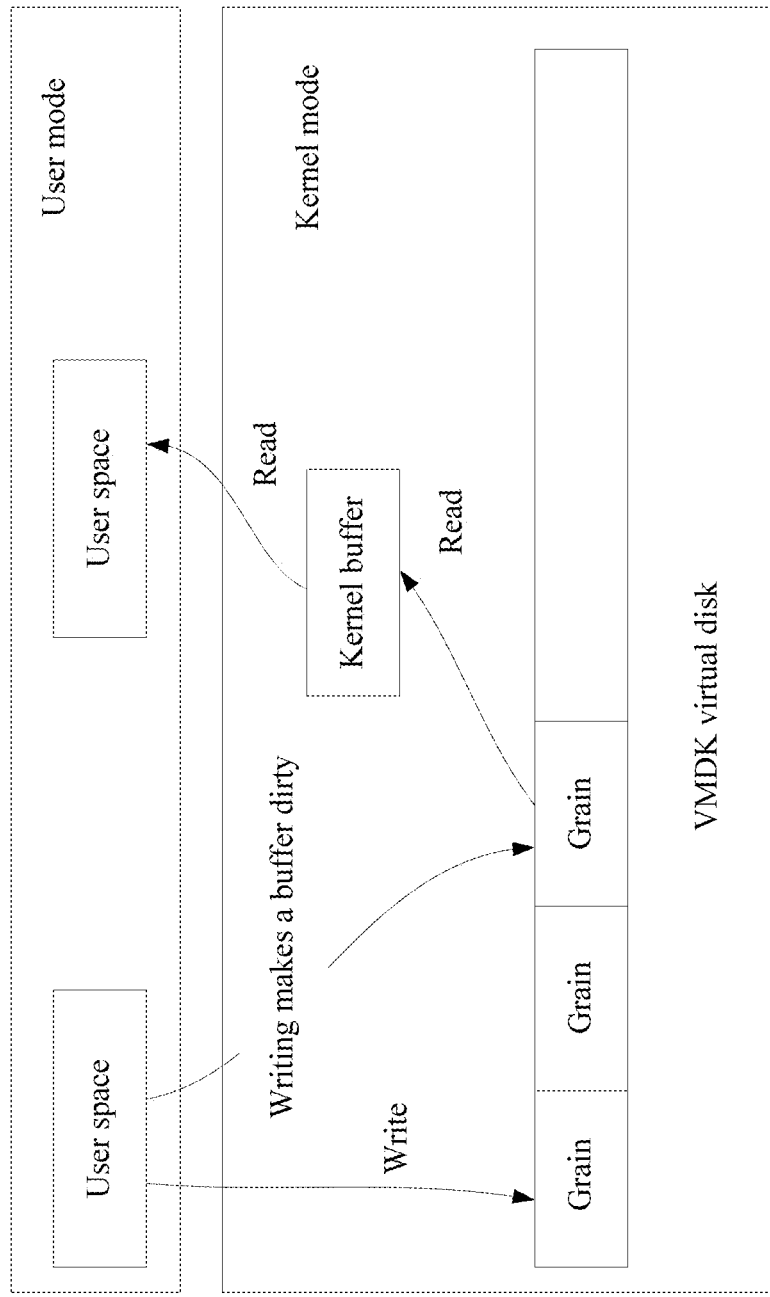
FIG. 12 is a schematic diagram of a read/write process of a kernel buffer according to an embodiment.

That is, when a read operation is performed on the virtual machine disk image file, the VDFS may translate an original address into a target address according to a corresponding storage block mapping table, and perform reading on an original VMDK file storage block using the target address. When a write operation is performed on the virtual machine disk image file, the VDFS may translate an original address into a target address according to a corresponding storage block mapping function, and perform writing on an original VMDK file storage block using the target address. When a first read operation occurs, a corresponding buffer block is maintained in a kernel control memory of the VDFS file system. For a subsequent read operation, data is directly returned to a corresponding buffer block before another write operation occurs. If a write operation occurs, to maintain data consistency, data is directly written at a corresponding physical address, and a corresponding buffer block is set to be dirty. The dirty block is re-read at the corresponding physical address and overwritten when a read operation occurs for a next time. A schematic diagram of a read/write process of the kernel buffer may be shown in FIG. 12.

Using the foregoing process, the VMM can efficiently online perform reading/writing on heterogeneous virtual machine disk image files in order to implement online format conversion, and ensure continuous service running of a virtual machine.

The foregoing mainly describes the solutions provided in the embodiments from the perspective of the network device. It may be understood that, to achieve the foregoing functions, the network device includes a corresponding hardware structure and/or software module for implementing each function. A person skilled in the art should be easily aware that units and algorithm steps in the examples described with reference to the examples described in the embodiments disclosed in this specification may be implemented in a form of hardware or in a form of a combination of hardware and computer software in this specification. Whether a function is performed by hardware or by computer software driving hardware depends on particular applications and design constraints of the technical solutions. A person skilled in the art may use different methods to implement the described functions for each particular application, but it should not be considered that the implementation goes beyond the scope of this disclosure.

The network device may be divided into function modules based on the foregoing method examples. For example, each function module may be obtained through division based on each corresponding function, or two or more functions may be integrated into one processing module. The integrated module may be implemented in a form of hardware, or may be implemented in a form of a software functional module. It should be noted that the module division in the disclosure is an example and is only logical function division. There may be other division manners in actual implementation.

Figure 13:
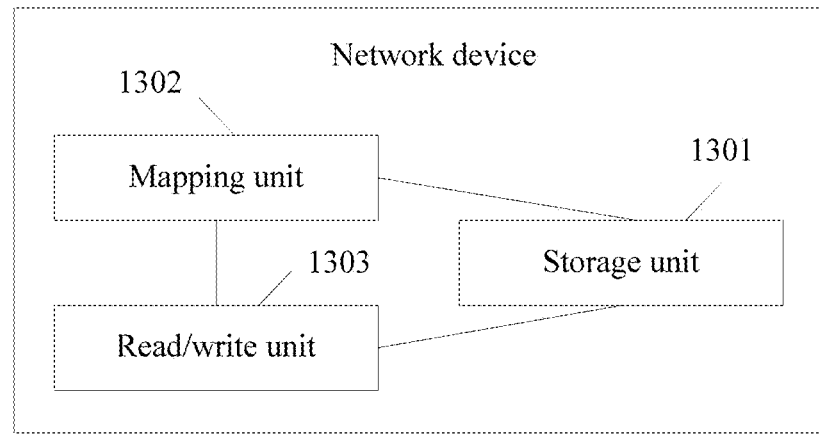
FIG. 13 is a schematic structural diagram of a network device according to an embodiment.

When an integrated unit is used, FIG. 13 is a possible schematic structural diagram of the network device described in the foregoing embodiments. A network device includes a mapping unit 1302 and a read/write unit 1303. The mapping unit 1302 may be configured to support the network device in performing the processes 401 and 402 in FIG. 4, the process 701 in FIG. 7, and/or another process of the technology described in this specification. The read/write unit 1303 is configured to support the network device in performing the process 403 in FIG. 4 and the process 702 in FIG. 7. The network device may further include a storage unit 1301 configured to store program code and data of the network device.

Both the mapping unit 1302 and the read/write unit 1303 may be processors or controllers, for example, a central processing unit (CPU), a general-purpose processor, a digital signal processor (DSP), an application-specific integrated circuit (ASIC), a field programmable gate array (FPGA) or another programmable logic device, a transistor logic device, a hardware component, or any combination thereof. The controller/processor may implement or execute various example logical blocks, modules, and circuits described with reference to content disclosed herein. Alternatively, the processor may be a combination for implementing a computing function, for example, a combination of one or more microprocessors, or a combination of the DSP and a microprocessor. The storage unit 1301 may be a memory.

Figure 14:
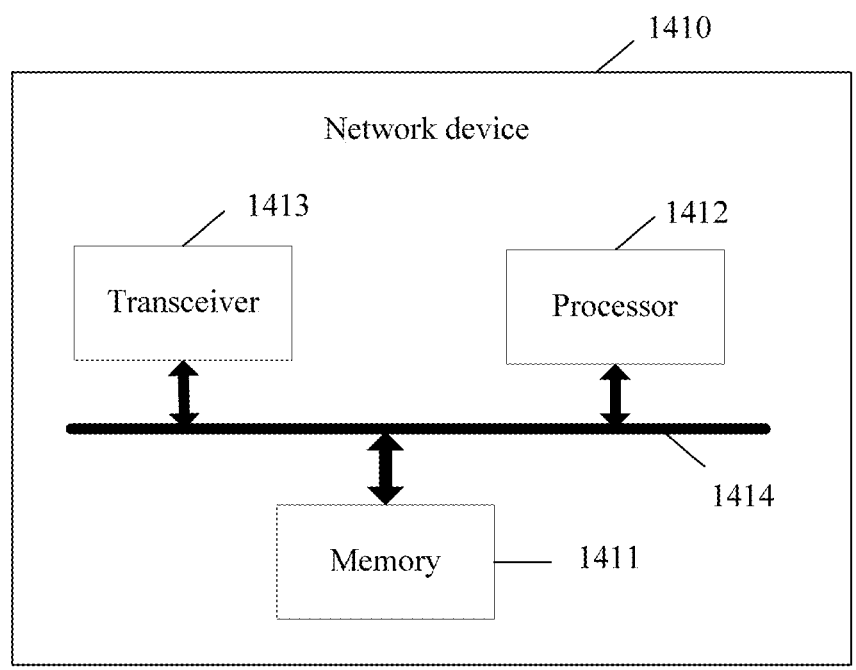
FIG. 14 is a schematic structural diagram of a network device according to an embodiment.

When both the mapping unit 1302 and the read/write unit 1303 may be a processor, and the storage unit 1301 is a memory, the network device may be a network device shown in FIG. 14.

As shown in FIG. 14, the network device 1410 includes a processor 1412, a transceiver 1413, a memory 1411, and a bus 1414. The processor 1412 and the memory 1411 are connected to each other using the bus 1414. The bus 1414 may be a Peripheral Component Interconnect (PCI) bus, an extended industry standard architecture (EISA) bus, or the like. The bus may be classified into an address bus, a data bus, a control bus, and the like. For ease of representation, only one thick line is used to represent the bus in FIG. 14, but this does not mean that there is only one bus or only one type of bus.

Methods or algorithm steps described in combination with the content disclosed may be implemented by hardware, or may be implemented by a processor by executing a software instruction. The software instruction may include a corresponding software module. The software module may be stored in a random access memory (RAM), a flash memory, a read-only memory (ROM), an erasable programmable ROM (EPROM), an electrically EPROM (EEPROM), a register, a hard disk, a removable hard disk, a compact disc (CD) ROM (CD-ROM), or any other form of storage medium well-known in the art. For example, a storage medium is coupled to a processor such that the processor can read information from the storage medium or write information into the storage medium. Certainly, the storage medium may be a component of the processor. The processor and the storage medium may be located in the ASIC. In addition, the ASIC may be located in a core network interface device. Certainly, the processor and the storage medium may exist in the core network interface device as discrete components.

A person skilled in the art should be aware that in the foregoing one or more examples, functions described may be implemented by hardware, software, firmware, or any combination thereof. When the present disclosure is implemented by software, the foregoing functions may be stored in a computer-readable medium or transmitted as one or more instructions or code in the computer-readable medium. The computer-readable medium includes a computer storage medium and a communications medium, where the communications medium includes any medium that enables a computer program to be transmitted from one place to another. The storage medium may be any available medium accessible to a general-purpose or dedicated computer.

The objectives, technical solutions, and benefits are further described in detail in the foregoing specific embodiments. It should be understood that the foregoing descriptions are merely specific embodiments, but are not intended to limit the protection scope of this disclosure. Any modification, equivalent replacement or improvement made based on the technical solutions of the present disclosure shall fall within the protection scope.

What is claimed is:

1. A virtual disk file format conversion method, implemented by a network device, comprising:
    establishing a mapping table between a virtual address of a virtual machine (VM) disk image file and a physical address of a disk image file compatible with a virtual machine monitor (VMM), wherein establishing the mapping table comprises:
        mounting the VM disk image file;
        determining a first storage grain of the VM disk image file based on metadata in the VM disk image file;
        mapping a block index of the VM disk image file to a most significant bit of the physical address when the first storage grain is inconsistent with a second storage grain of the disk image file; and
        mapping an intra-block index of the VM disk image file to a remaining address of the disk image file that is compatible with the VMM;
    converting, according to the mapping table, the virtual address into the physical address when a user performs a data reading operation or a data writing operation on the VM disk image file; and
    performing data reading or data writing on the VM disk image file based on the physical address.

2. The virtual disk file format conversion method of claim 1, wherein establishing the mapping table comprises performing one-to-one mapping on first data blocks of the VM disk image file and second data blocks of the disk image file when the first storage grain is consistent with a second storage grain of the disk image file.

3. The virtual disk file format conversion method of claim 1, wherein converting the virtual address into the physical address comprises:
    determining that the user performs the data reading operation on the VM disk image file; and
    obtaining, according to the mapping table, a block index of the virtual address, and an intra-block index of the virtual address, the physical address mapped to the virtual address.

4. The virtual disk file format conversion method of claim 3, wherein performing the data reading or the data writing on the VM disk image file comprises performing the data reading on the VM disk image file using the physical address.

5. The virtual disk file format conversion method of claim 1, wherein converting the virtual address into the physical address comprises:
    determining that the user performs the data writing operation on the VM disk image file; and
    obtaining, according to the mapping table, a block index of the virtual address, and an intra-block index of the virtual address, the physical address.

6. The virtual disk file format conversion method of claim 5, wherein performing the data reading or the data writing on the VM disk image file comprises performing the data writing on the VM disk image file using the physical address.

7. The virtual disk file format conversion method of claim 1, further comprising:
    determining that the user performs the data reading operation on a data block corresponding to the virtual address for a first time;
    reading first data at the physical address according to the mapping table; and
    creating a buffer block in a memory to read the first data from the buffer block during a subsequent data reading operation on the data block.

8. The virtual disk file format conversion method of claim 7, further comprising:
    determining that the user performs the data writing operation on the data block;
    writing second data at the physical address according to the mapping table; and
    marking the buffer block as a dirty data block to enable the network device to re-read the second data at the physical address and to overwrite the buffer block when the user performs the subsequent data reading operation on the data block for a next time.

9. A network device, comprising:
a memory configured to store instructions; and
a processor coupled to the memory, wherein the instructions cause the processor to be configured to:
establish a mapping table between a virtual address of a virtual machine (VM) disk image file and a physical address of a disk image file compatible with a virtual machine monitor (VMM), wherein establishing the mapping table comprises:
mounting the VM disk image file;
determining a first storage grain of the VM disk image file based on metadata in the VM disk image file;
mapping a block index of the VM disk image file to a most significant bit of the physical address when the first storage grain is inconsistent with a second storage grain of the disk image file; and
mapping an intra-block index of the VM disk image file to a remaining address of the disk image file that is compatible with the VMM;
convert, according to the mapping table, the virtual address into the physical address when a user performs a data reading operation or a data writing operation on the VM disk image file; and
perform data reading or data writing on the VM disk image file based on the physical address.

10. The network device of claim 9, wherein the instructions further cause the processor to be configured to
perform one-to-one map on first data blocks of the VM disk image file to second data blocks of the disk image file when the first storage grain is consistent with a second storage grain of the disk image file.

11. The network device of claim 9, wherein the instructions further cause the processor to be configured to:
determine that the user performs the data reading operation on the VM disk image file;
obtain, according to the mapping table, a block index of the virtual address, and an intra-block index of the virtual address, the physical address; and
perform the data reading on the VM disk image file using the physical address.

12. The network device of claim 9, wherein the instructions further cause the processor to be configured to:
determine that the user performs the data writing operation on the VM disk image file;
obtain, according to the mapping table, a block index of the virtual address, and an intra-block index of the virtual address, the physical address mapped to the virtual address; and
perform the data writing on the VM disk image file using the physical address.

13. The network device of claim 9, wherein the instructions further cause the processor to be configured to:
determine that the user performs the data reading operation on a data block corresponding to the virtual address for a first time;
read first data at the physical address according to the mapping table; and
create a buffer block in a memory to read first data from the buffer block during a subsequent data reading operation on the data block.

14. The network device of claim 13, wherein the instructions further cause the processor to be configured to:
determine that the user performs the data writing operation on the data block;
write second data at the physical address according to the mapping table; and
mark the buffer block as a dirty data block to enable the network device to re-read the second data at the physical address and to overwrite the buffer block in the memory when the user performs the subsequent data reading operation on the data block for a next time.

15. A computer program product comprising computer-executable instructions for storage on a non-transitory computer-readable medium that, when executed by a processor, cause an apparatus to:
establish a mapping table between a virtual address of a virtual machine (VM) disk image file and a physical address of a disk image file compatible with a virtual machine monitor (VMM), wherein establishing the mapping table comprises:
mounting the VM disk image file;
determining a first storage grain of the VM disk image file based on metadata in the VM disk image file;
mapping a block index of the VM disk image file to a most significant bit of the physical address when the first storage grain is inconsistent with a second storage grain of the disk image file; and
mapping an intra-block index of the VM disk image file to a remaining address of the disk image file that is compatible with the VMM;
convert, according to the mapping table, the virtual address into the physical address when a user performs a data reading operation or a data writing operation on the VM disk image file; and
perform data reading or data writing on the VM disk image file based on the physical address.

16. The computer program product of claim 15, wherein the instructions further cause the apparatus to
perform one-to-one map on first data blocks of the VM disk image file to second data blocks of the disk image file when the first storage grain is consistent with a second storage grain of the disk image file.

17. The computer program product of claim 15, wherein the instructions further cause the apparatus to:
determine that the user performs the data reading operation on the VM disk image file;
obtain, according to the mapping table, a block index of the virtual address, and an intra-block index of the virtual address, the physical address; and
perform the data reading on the VM disk image file using the physical address.

18. The computer program product of claim 15, wherein the instructions further cause the apparatus to:
determine that the user performs the data writing operation on the VM disk image file;
obtain, according to the mapping table, a block index of the virtual address, and an intra-block index of the virtual address, the physical address mapped to the virtual address; and
perform the data writing on the VM disk image file using the physical address.

19. The computer program product of claim 15, wherein the instructions further cause the apparatus to:
determine that the user performs the data reading operation on a data block corresponding to the virtual address for a first time;
read first data at the physical address according to the mapping table; and create a buffer block in a memory to read first data from the buffer block during a subsequent data reading operation on the data block.

\* \* \* \* \*